US007672986B2

(12) United States Patent
Gilbert et al.

(10) Patent No.: US 7,672,986 B2
(45) Date of Patent: Mar. 2, 2010

(54) MANAGING GRAPHIC DATABASES

(75) Inventors: Brent Gilbert, Mukilteo, WA (US); Mai-lan Tomsen Bukovec, Seattle, WA (US); Owen Edwards, Seattle, WA (US); Cynthia Christine Shelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 10/777,732

(22) Filed: Feb. 12, 2004

(65) Prior Publication Data

US 2005/0182790 A1 Aug. 18, 2005

(51) Int. Cl.
G06F 17/30 (2006.01)
(52) U.S. Cl. .............................. 707/770; 707/999.003; 707/999.004; 707/999.005; 707/999.006; 706/45; 706/48
(58) Field of Classification Search .................... 707/3, 707/10, 1, 770; 706/45, 48
See application file for complete search history.

(56) References Cited

U.S. PATENT DOCUMENTS

| 4,710,870 | A | | 12/1987 | Blackwell et al. |
| 5,241,671 | A | | 8/1993 | Reed et al. |
| 5,657,049 | A | | 8/1997 | Ludolph et al. |
| 5,745,096 | A | | 4/1998 | Ludolph et al. |
| 5,751,286 | A | * | 5/1998 | Barber et al. ................ 715/835 |
| 5,778,374 | A | | 7/1998 | Dang et al. |
| 5,884,035 | A | | 3/1999 | Butman et al. |
| 5,907,845 | A | | 5/1999 | Cox et al. |
| 6,021,412 | A | * | 2/2000 | Ho et al. ................... 707/104.1 |
| 6,260,040 | B1 | | 7/2001 | Kauffman et al. |
| 6,351,746 | B1 | | 2/2002 | Gebauer |
| 6,412,004 | B1 | * | 6/2002 | Chen et al. ................... 709/226 |
| 6,445,834 | B1 | | 9/2002 | Rising, III |
| 6,564,254 | B1 | | 5/2003 | Shoji et al. |
| 6,658,598 | B1 | * | 12/2003 | Sullivan ....................... 714/25 |
| 7,167,920 | B2 | * | 1/2007 | Traversat et al. ............. 709/230 |
| 2003/0030662 | A1 | | 2/2003 | Poisson et al. |
| 2003/0140035 | A1 | * | 7/2003 | Burrows ......................... 707/3 |
| 2003/0140038 | A1 | * | 7/2003 | Baker et al. ..................... 707/3 |

FOREIGN PATENT DOCUMENTS

GB 2 353 135 2/2001

OTHER PUBLICATIONS

Microsoft website; Microsoft Knowledge Base Article—299249; Visio2002: You Are Unable to Drag Shapes from a Web Search to Your Drawing; copyright 2004 Microsoft Corporation; http://support.microsoft.com/default.aspx?kbid=299249.
European Search Report for European Patent Application No. EP 05 10 0849.8, Microsoft Corporation, Feb. 16, 2005.

* cited by examiner

Primary Examiner—Apu M Mofiz
Assistant Examiner—Monica M Pyo
(74) Attorney, Agent, or Firm—Perkins Coie LLP

(57) ABSTRACT

A public graphic library coupled to a WAN offers access to a database of graphics, while another graphic library inside the firewall of an enterprise network provides graphics to users in an enterprise. Transferring graphics from the public graphic library to the enterprise graphic library enables enterprise users to access content residing on the public graphic library while the enterprise network is disconnected or otherwise isolated from the WAN. A remote library director in a drawing software program directs communication between a user computer and either the public graphic library or the enterprise graphic library. The configuration of this director specifies the library from which a user accesses graphics.

17 Claims, 11 Drawing Sheets

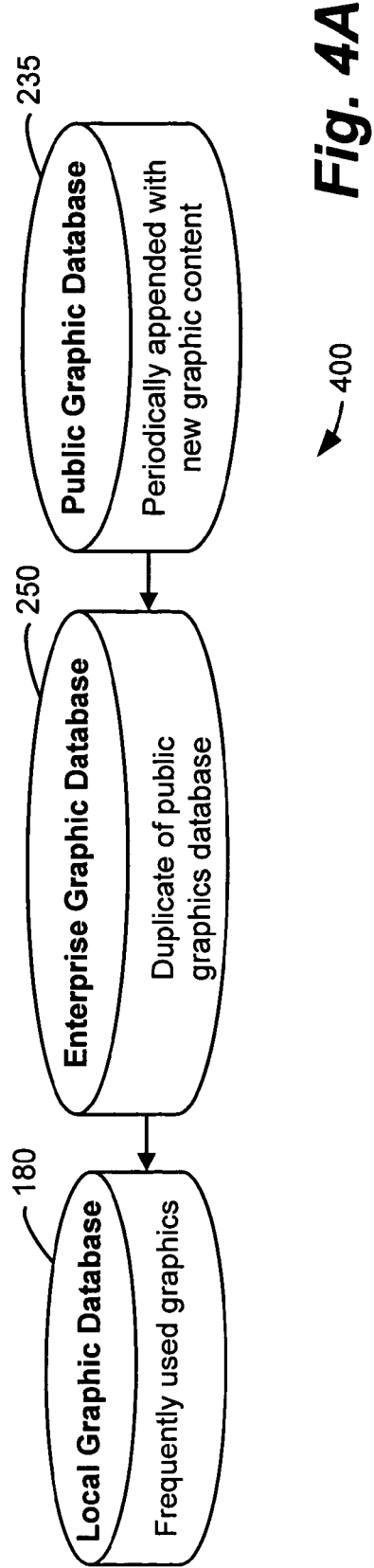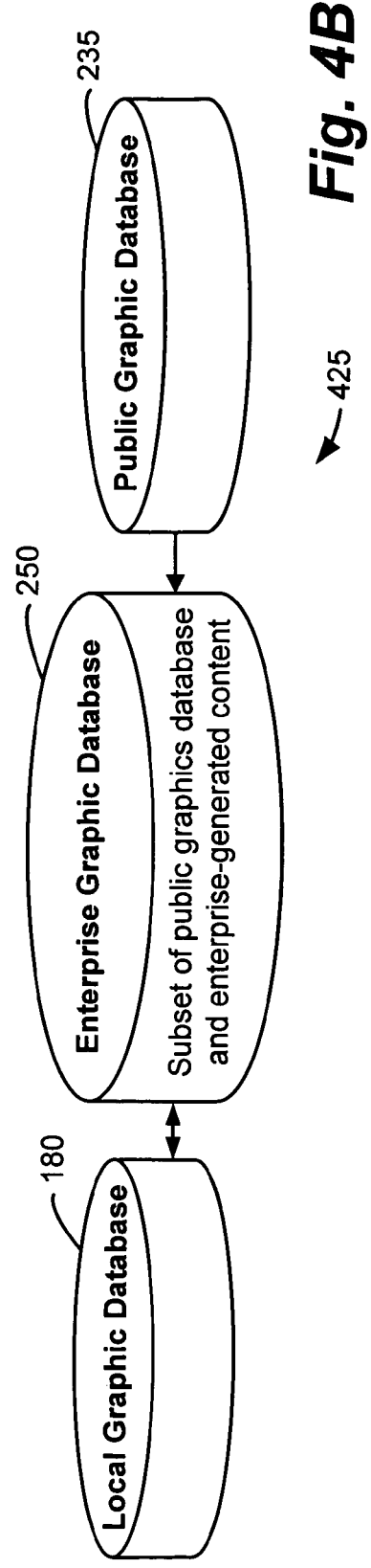

MANAGING GRAPHIC DATABASES

TECHNICAL FIELD

The present invention relates to managing graphical databases in association with communication networks and more specifically to searching and maintaining graphic databases for access in enterprise networks.

BACKGROUND OF THE INVENTION

Computer programs are widely available for creating drawings and other documents with graphic content. These programs incorporate a variety of tools to aid a user in creating and manipulating graphics, such as icons, images, drawings, diagrams, clip art, artwork, pictures, symbols, line drawings, and similar visual content through a computer and its associated user interface ("UI"). In addition to creating graphics from scratch, a user may acquire a predefined graphic from a graphic database and subsequently customize its color, size, orientation, shape, or other feature.

Suppliers of graphics frequently supply graphic databases written onto one or more compact disk read-only memory ("CD-ROM") devices or similar optical medium. Configuring the graphics in the database in an industry-standard format facilitates compatibility with software programs from a wide range of vendors. Alternatively, a software vendor may supply a proprietary graphic database coupled to a drawing software package. The process of installing the drawing software onto a computer loads the graphic database onto the computer's hard drive so a user can quickly access the database's graphics.

In addition to providing a graphic database installed on a user's hard drive, a software vendor may provide access to a central graphic database over a wide-area network ("WAN"). For example, a vendor may offer access over the Internet, which is a WAN, to a public database of graphic content using a configuration that provides exclusive access to users of the vendor's software. A module in the software that is resident on the user's computer directs the software to communicate over the Internet with the vendor's site when the user requests graphic content. The vendor may regularly append and update the public database to enhance the value of the graphic database to its customers and to adapt to trends in the graphic preferences of users.

While conventional WAN-based public graphic databases are suited to graphic updates, the graphic file sizes can impede the speed with which a remote user accesses graphics from such a database. To address file transfer speed limitations, the communication link between the user and the remote database may include an application server page ("ASP") that functions as a database gateway and facilitates expeditious information transfer. The ASP accepts user search requests, communicates with a server to seek graphics that meet the search terms, and returns metadata to the user. If a user determines that a graphic is acceptable based on the metadata, the user may elect to download the full graphic file.

Although relaying metadata through ASPs promotes efficient transfer of graphics, such transfer is generally implemented over a WAN, such as the Internet. Data that is transferring across such a WAN encounters potential time delays associated with the physical expanse of the WAN, communication bottlenecks such as WAN access interfaces, and other communication impediments.

Another problem with typical WAN-based graphic databases is that all users do not have the Internet connectivity generally associated with accessing the database. Certain enterprises have internal computer networks that are disconnected, locked down, or otherwise isolated from the Internet or other WAN. Some users' connectivity may be intermittent, slow, or unreliable. Furthermore, a fault in the WAN communication link between the user and the WAN-based graphic can disrupt a user's database access.

In addition to having communication-related limitations, WAN-based graphic databases are usually public databases that offer the same content to all the users that they serve. The content is often optimized to maximize the number of graphic choices that are available to users. Such databases generally lack provisions to provide a user with custom graphics or graphic sets that are specifically tailored to meet the standardization requirements of a specific user or set of users. That is, conventional WAN-based databases are usually incompatible with the needs of enterprises that seek to provide their internal users with a standard, consistent graphic set.

To address these representative deficiencies in the graphic database art, what is needed is a capability for managing graphic databases that serves users that are disconnected or otherwise isolated from the Internet or other WAN. Further a capability is needed to provide enterprise-based users with graphic sets that are tailored to meet specific content needs of the enterprise. Such capabilities would benefit users that need graphic content for insertion into drawings and other documents.

SUMMARY OF THE INVENTION

The present invention supports providing users in an enterprise with access to a database of graphics. In one aspect of the present invention, a public graphic library is accessible to software users via the Internet or other network that spans a large geographic area and/or offers unrestricted access. Using Internet connectivity, users can download graphics for insertion into drawings and other documents. An administrator of this public graphic library can regularly update the graphic content of the library. Another graphic library can be coupled to a computer network in an enterprise, such as a business or other organization, to serve users of the enterprise that lack open access to the public graphic library. This enterprise graphic library can include content, in whole or in part, from the public graphic library. Access to the enterprise graphic library can be restricted to the enterprise's users and others having authorization.

In another aspect of the present invention, a software program or module can include a configuration that can point either to the public graphic library on the Internet or the enterprise graphic library on the enterprise's network. Configuring the software so that it points to the public graphic library can direct graphic communication between the software and the public graphic library so a user can download graphics from the public graphic library over the Internet. On the other hand, configuring the software so that it points to the enterprise graphic library can direct graphic communication between the software and the enterprise graphic library so a user can download graphics from the enterprise's graphic library over the enterprise's network. The configuration can include a network address that points to the network location of a graphic library. The address can be written into a configuration database associated with the operating system of the computer upon which the software runs, for example setting a registry key.

In another aspect of the present invention, the public graphic library and the enterprise graphic library can include parallel functionality. Duplicating the functionality of the public graphic library in the enterprise graphic library can facilitate the software communicating with the enterprise library in large part as if it was the public graphic library. The software can communicate with either the enterprise graphic library or the public graphic library using common communication methods such as protocols and standards. An information gateway that provides a centralized communication point in the public graphic library can correspond to an information gateway in the enterprise graphic library that provides parallel functionality. These gateways can be ASPs.

In yet another aspect of the present invention, a user can search a remote graphic library for a suitable graphic. The user can enter search terms that can be transmitted to the library. The library can return a list of graphics that match the search term along with a textual description and an abridged graphic, such as a bitmapped image, for each listed graphic. When the user selects a specific graphic from the list for insertion into a drawing, the library can transmit the full, unabridged graphic. Transmitting a list of abridged images in preparation for transmitting a full graphic from the list can promote timely transfer of graphical data.

The discussion of graphic databases presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

FIGS. 4A, 4B, and 4C illustrate local, enterprise, and public databases according to exemplary embodiments of the present invention.

DETAILED DESCRIPTION OF EXEMPLARY EMBODIMENTS

The present invention is directed to managing, networking, and accessing graphic databases in a manner that provides database access to enterprise-based users that are disconnected or otherwise isolated from the Internet or another WAN and/or that are impeded from downloading graphics from WAN-based graphic databases.

Turning now to discuss each of the drawings presented in FIGS. 1-9, in which like numerals indicate like elements throughout the several figures, an exemplary operating environment and an exemplary embodiment of the present invention will be described in detail.

Figure 1:
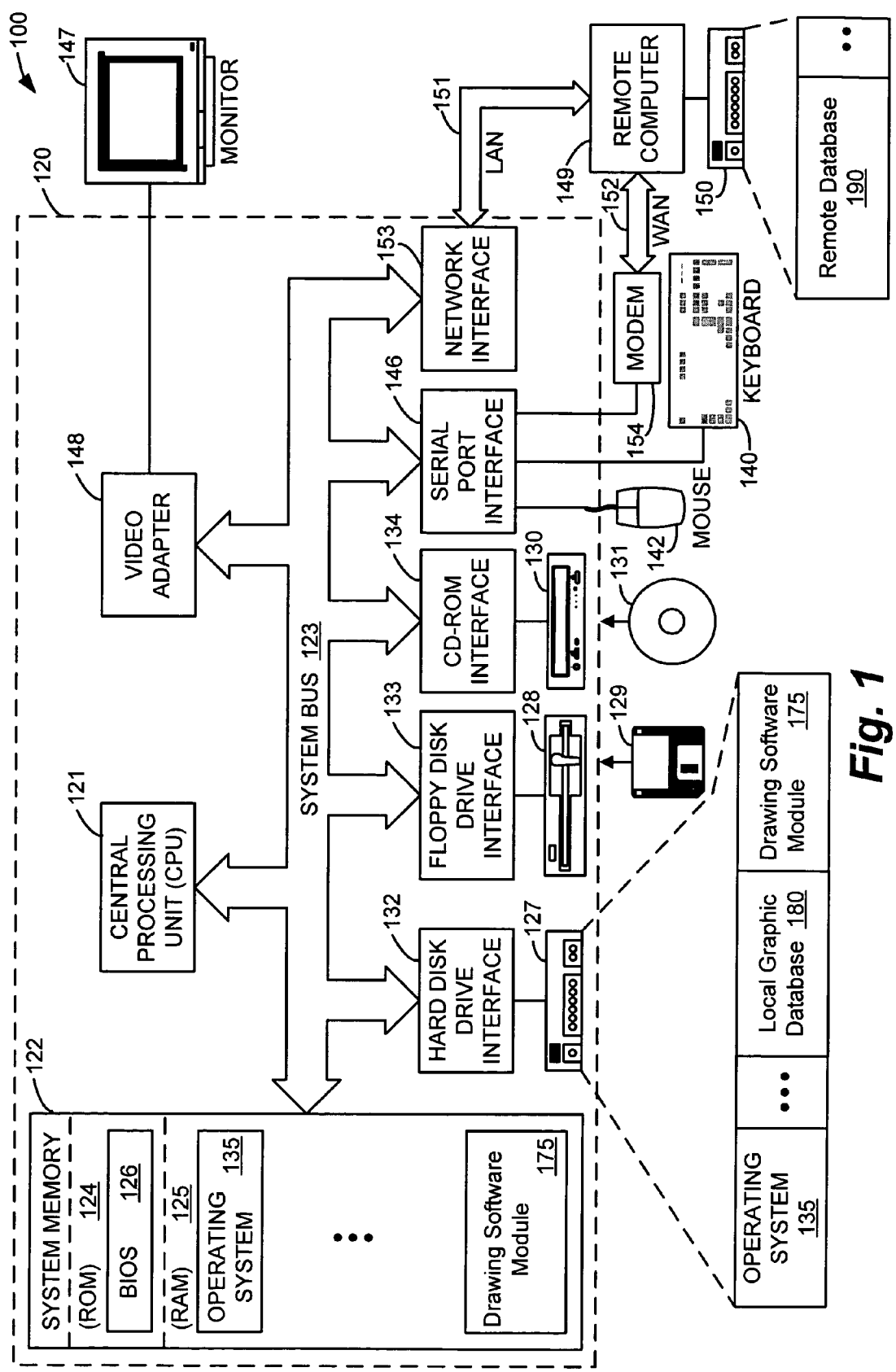
FIGS. 1 is a functional block diagram illustrating an operating environment according to an exemplary embodiment of the present invention.

FIG. 1 illustrates an exemplary operating environment for implementation of the present invention according to one embodiment of the present invention. The exemplary operating environment includes a general-purpose computing device in the form of a conventional personal computer 120, as exemplified by the architectural overview 100 in FIG. 1. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory 122 includes a read-only memory ("ROM") 124 and a random access memory ("RAM") 125. A basic input/output system ("BIOS") 126, containing the basic routines that help to transfer information between elements within the personal computer 120, such as during startup, is stored in ROM 124.

The personal computer 120 further includes a hard disk drive/hard disk 127, a magnetic disk drive 128 for reading from or writing to a removable magnetic disk 129, and an optical disk drive 130 for reading from or writing to a removable optical disk 131 such as a compact disk read-only memory ("CD-ROM") or other optical media. The hard disk drive 127, magnetic disk drive 128, and optical disk drive 130 are each connected to the system bus 123 by a hard disk drive interface 132, a magnetic disk drive interface 133, and an optical disk drive interface 134, respectively.

Although the exemplary environment described herein employs a hard disk 127, a removable magnetic disk 129, and a removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for the personal computer 120.

A number of program modules may be stored on the hard disk 127, magnetic disk 129, optical disk 131, ROM 124, or RAM 125, including an operating system 135 and a drawing software module 175. Program modules include routines, sub-routines, programs, objects, components, data structures, etc., which perform particular tasks or implement particular abstract data types. Aspects of the present invention may be implemented in the form of a drawing software module 175. Storing frequently used data on the hard drive 127 facilitates expeditious access by active software running on the computer 120, for example the drawing software module 175 has ready access to graphics from the local graphic database 180.

A user may enter commands and information into the personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus ("USB"), or the like. A display device 147 may also be connected to the system bus 123 via an interface, such as a video adapter 148. In addition to the monitor 147, personal computers typically include other peripheral output devices (not shown), such as speakers and printers.

The pointing device 142 can control a pointer, such as a cursor on a displayed, or electronic, page. Moving a mouse or a trackball, for example, can adjust the position of the pointer on the displayed page. The pointing device 142 can also include a button or similar feature through which a user can communicate with software routines executing in the computer system 120. For example, a user of a drawing software package can position the pointer over an object on an electronic page and depress the button to select the object. With the object selected and the pointing device button in the depressed state, the user can reposition the object on the page and release the click to set the object into its new position on the page using a drag-and-drop gesture.

The personal computer 120 may operate in a networked environment using logical connections to one or more remote computers 149. A remote computer 149 may be another personal computer, a server, a client, a router, a network personal computer, a peer device, or other common network node. While a remote computer 149 typically includes many or all of the elements described above relative to the personal computer 120, only its memory storage device 150 has been illustrated in FIG. 1. The logical connections depicted in FIG. 1 include a local-area network ("LAN") 151 and a WAN 152. Such networking environments are commonplace in offices, enterprise-wide computer networks, intranets, and the Internet.

When used in a LAN networking environment, the personal computer 120 is often connected to the LAN 151 through a network interface or adapter 153. When used in a WAN networking environment, the personal computer 120 typically includes a modem 154 or other apparatus for establishing communications over a WAN 152, such as the Internet. The modem 154, which may be internal or external, is connected to a system bus 123 via serial port interface 146. In a networked environment, programs such as the drawing software module 175, can access information, such as a graphic, from a remote database 190 of information via the LAN 151 or the WAN 152. It will be appreciated that the network connections shown are exemplary and other provisions for establishing a communications link between the computers may be used.

Moreover, those skilled in the art will appreciate that the present invention may be implemented in other computer system configurations, including handheld devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

In one exemplary embodiment of the present invention, the present invention includes hardware and software components illustrated in FIG. 1. That is, an exemplary embodiment of the present invention includes a computer 120, LAN 151, WAN 152, drawing software module 175, and one or more types of remote databases 175, as will be discussed below in reference to FIGS. 2-9.

The term "enterprise," as used herein, refers to an organization, such as a business, school, government department, military base, association, political unit, or other institution, that utilizes computers. An enterprise can be located in a single facility, physically concentrated in a campus or other collection of buildings, or dispersed across a geographic area.

The term "enterprise network," as used herein, refers to a computer network, such as a LAN 151 or campus-area network ("CAN"), that serves a specific enterprise. The terms "LAN" and "local-area network," as used herein, refer to a computer network that spans a relatively small area. Most LANs 151 are confined to a single building or group of buildings. An Ethernet is an example of a LAN 151.

An "intranet," as used herein, refers to an enterprise network based on Internet protocols that is accessible only by the enterprise's constituents and others with authorization. Secure intranets are either disconnected from the Internet or otherwise isolated by a firewall or other device that restricts network access. An intranet's websites look and function in a manner similar to Internet Web sites.

The terms "WAN" and "wide-area network," as used herein, refer to a computer network that spans a relatively large geographic area and typically includes a connection between two or more LANs 151. The Internet is a WAN 152 that is a global network connecting millions of computers. A metropolitan-area network ("MAN") is type of WAN 152 that is configured for a town, city, or metropolitan area. While WANs 152 often include communication links through a public network such as the telephone system, they can also include leased lines or satellites.

The term "public," as used herein in connection with a network, library, or database, refers to a network, library, or database having access that is not restricted to the constituents of a specific enterprise and others having authorization. For example, a network, library, or database that is accessible only to purchasers of a specific software package is typically public since those purchasers come from multiple businesses or other enterprises. In contrast, the term "private," as used herein in connection with a network, library, or database, refers to a network, library, or database this is accessible only to a defined set of users and others with authorization. Private databases often have content that is customized to the needs of a specific enterprise, for example.

In addition to these networking terms, other terminology will be referenced and described in conjunction with the discussions below. The present invention includes multiple computer programs which embody the functions described herein and illustrated in the exemplary displays, functional block diagrams, and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary displays, functional block diagrams, and flow charts and associated description in the application text, for example.

Therefore, disclosure of a particular set of program code instructions is not considered necessary for an adequate understanding of how to make and use the invention. The inventive functionality of the computer program aspects of the present invention will be explained in more detail in the following description in conjunction with the remaining figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 2:
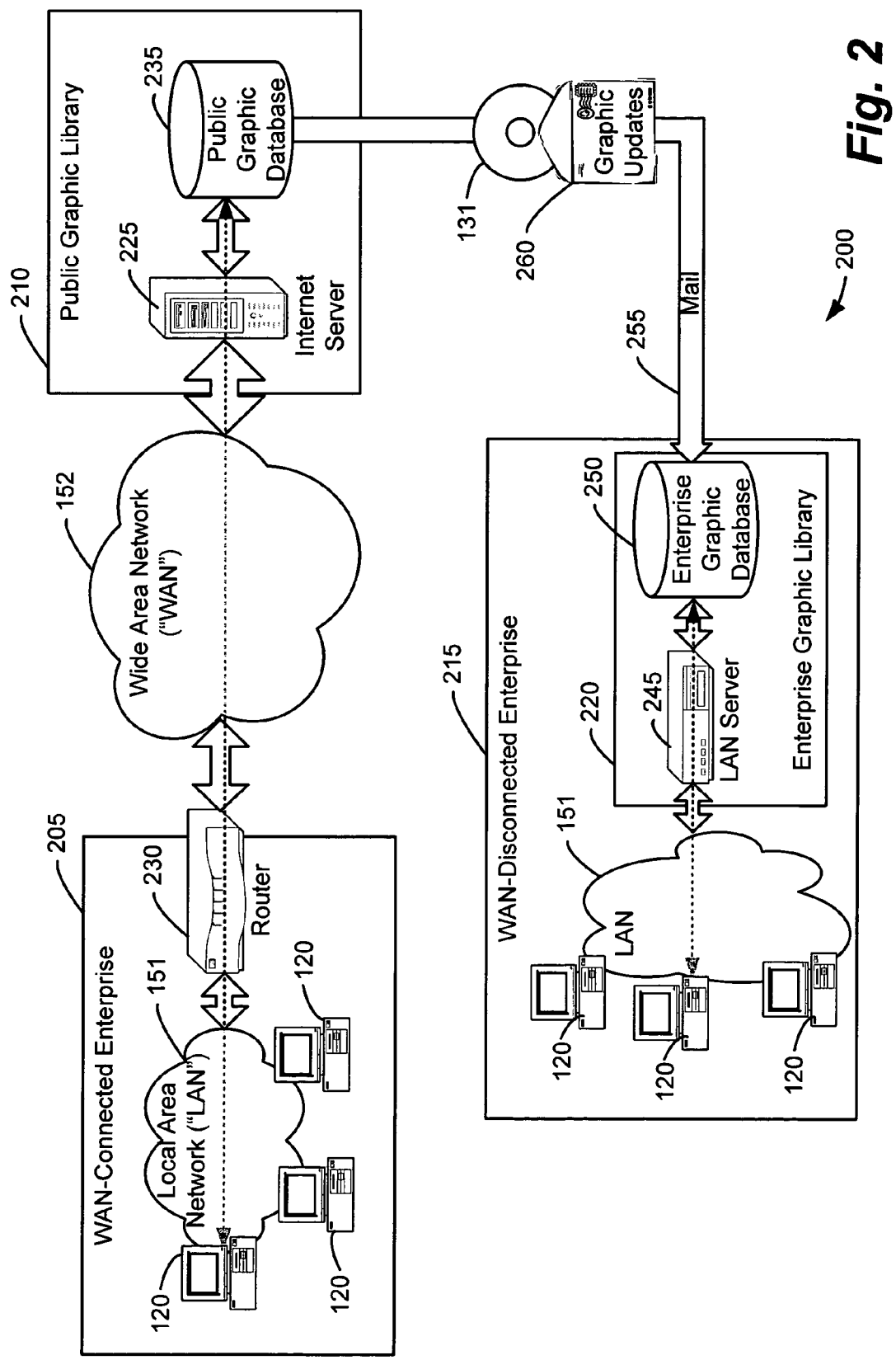
FIG. 2 is a functional block diagram illustrating an enterprise coupled to a public graphic library via a WAN and another enterprise coupled to an enterprise graphic library via a LAN according to an exemplary embodiment of the present invention.

Processes and components of an exemplary embodiment of the present invention will be further described in reference to FIGS. 2-9. Turning now to FIG. 2, this figure is a functional block diagram 200 illustrating an enterprise 205 coupled to a public graphic library 210 via a WAN 152 and another enterprise 215 coupled to an enterprise graphic library 220 via a LAN 151 according to an exemplary embodiment of the present invention. The enterprise 215 with the enterprise graphic library 220 is illustrated in a state of disconnection from the WAN 152 that serves as a bridge to the public graphic library 210.

The WAN-connected enterprise 205 includes a LAN 151 of computers 120 with a router 230 that provides access to the WAN 152. This communication system affords the users of the enterprise 205, who interface with these computers 120, access resources over the WAN 152. Although FIG. 2 depicts a single WAN-connected enterprise 205, numerous WAN-connected enterprises 205 and individual users typically couple to the public graphic library 210 from various sites on the WAN 152.

In one embodiment of the present invention, the WAN 152 is the Internet 152 and the computers 120 and router 230 communicate with the Internet 152 using the Internet's standard suite of communication protocols. In one embodiment of the present invention, this protocol is transmission control protocol/Internet protocol ("TCP/IP").

A public graphics library 210 resides on the WAN 152 at a location that is distinct from the WAN-connected enterprise 205. The public graphics library 210 includes a public graphic database 235 associated with an Internet server 225. The public graphic database 235 is a database of public graphic content that is accessible to the computers 120 in the WAN-connected enterprise 205 and other individual users and entities that have access to the WAN 152 from an Internet service provider ("ISP") or other access arrangement.

The public graphic database 235 contains a wide assortment of graphics, such as drawings, diagrams, clip art, symbols, line drawings, images, and other visual content useful to the public graphic library's clients. Typical content includes two-dimensional and perspective line representations of flow chart shapes, electrical symbols, marketing diagrams, computing illustrations, call out bubbles, and many other images.

In one exemplary embodiment of the present invention, the content of the public graphic database 235 is voluminous so as to meet the varied image needs and preferences of a wide range of users. For example, this database 235 might feature an assortment of styles of electrical symbols, each style meeting the standards of a different standards-governing body or the preferences of an engineering firm. Users needing to comply with the European standards might select one electrical transformer symbol while those seeking to comply with United States standards might select a different symbol representative of a transformer.

An administrator of the public graphic library 210 regularly updates the public graphic database 235 so it is current with changes in drawing standards and trends in user preferences. The administrator also analyzes the graphic requests that arrive at this library 210 and responds by augmenting content in popular areas and filling in content gaps as they become apparent. Consequently, the public graphic database 235 evolves and expands over time.

In one exemplary embodiment of the present invention, a vendor of drawing software 175 configures and administers the public graphic library 210 to restrict accessibility to users of the vendor's software 175. In other words, a software vendor can design its drawing software modules 175 and the public graphic library 210 so that the public graphic database 235 is exclusively compatible with this software 175.

In association with the graphic content, the public graphic library 210 contains metadata. Each metadata entry is linked to a specific graphic, and each graphic is linked to a specific metadata entry. The metadata for each graphic includes a searchable textual description and an abridged image, such as a bit-mapped image, that has significantly fewer digital bytes that the graphic itself. In order to conserve communication bandwidth and expedite communication, the public graphic library 210 transmits metadata prior to sending a graphic over the WAN 152 to a user. If the user determines that the received metadata indicates that a graphic is suitable, the user requests the full graphic and the public graphic library 210 complies with the request.

Like the WAN-connected enterprise 205, the WAN-disconnected enterprise 215 has a LAN 151 of computers 120 whose users lack immediate WAN-based access to the graphic resources of the public graphic database 235. Any of numerous conditions can isolate the WAN-disconnected enterprise 215 from the WAN 152. A failure in an access point onto the WAN 152 or in a communication path between a computer 120 and the public graphic database 235 can cause isolation. If a low-speed connection couples the WAN-disconnected enterprise 215 to the WAN 152, but the connection lacks sufficient bandwidth to provide users with access to the public graphic library 210, then the enterprise 215 is disconnected from the WAN 152 in terms of connectivity to the public graphic library 210. Management of a WAN-disconnected enterprise may provide users with access to the WAN 152 but block their access to the public graphic library 210. The WAN-disconnected enterprise 215 may simply lack an Internet connection because such connection is unavailable in a geographic locale, due to economic reasons, or as a consequence of other circumstances. In other words, in a WAN-disconnected enterprise 215 can either be physically disconnected from the WAN 152 or otherwise isolated from WAN-based access to the remote graphic library 210. In one embodiment of the present invention, the WAN-disconnected enterprise's LAN 151 is a private network.

In place of the public graphic library 210, the WAN-disconnected enterprise 215 maintains an enterprise graphic library 220 coupled to its LAN 151. The enterprise graphic library 220 provides graphics to the users coupled to the LAN 151 of this enterprise 215. A LAN server 245 provides a link between the enterprise graphic database 250, which is a database of graphics similar to the public graphic database 235, and the LAN 151. That is, users on the LAN 151 remotely access the enterprise graphic database 250 over the LAN 151 via the LAN server 245.

In addition to providing the benefit of accessibility, connecting a graphic database directly to an enterprise's LAN 151 offers an enterprise 215 speed benefits for downloading and/or uploading graphics. Rather than configuring its user computers 120 and/or the associated software to access graphics remotely over the WAN 152, a WAN-disconnected enterprise 215 can setup and maintain a high-speed LAN network 151 coupled to the enterprise graphic database 250.

Such a high-speed LAN network 151 is often more economical than obtaining and maintaining a WAN connection providing equivalent bandwidth to the public graphic database 235.

The enterprise graphic database 250 receives graphic content 260 from the public graphic database 235 stored on a physical medium, such as a CD-ROM 131, as traditional mail over a physical mail communication link 255, such as United States Postal Service or other transportation service. When graphic updates 260 arrive from the public graphic library 210, the information technology ("IT") department of the WAN-disconnected enterprise 215 can elect to update the enterprise graphic database 250 with the new content 260. The IT department may implement a full database replacement to synchronize the enterprise graphic database 250 with the public graphic database 235. Alternatively, the IT department or other management personnel can opt to selectively modify the enterprise graphic database 250 with the new content 260. The updates 260 typically arrive periodically, for example semiannually, quarterly, or monthly.

As an alternative to receiving graphic content 260 written on a physical medium 260, the IT department of the WAN-disconnected enterprise 215 can communicate with the public graphics library 210 via a communication link, such as a WAN 152. In this case, the WAN-disconnected enterprise 215 maintains a WAN connection that is not directly available to users on the LAN 151 for downloading graphics from the public graphic database 235. The IT department downloads graphics from the public graphic database 235 at an appropriate time interval and loads the graphics, in full or in part, into the enterprise graphic database 250 where it is accessible to users on the LAN 151.

Figure 3:
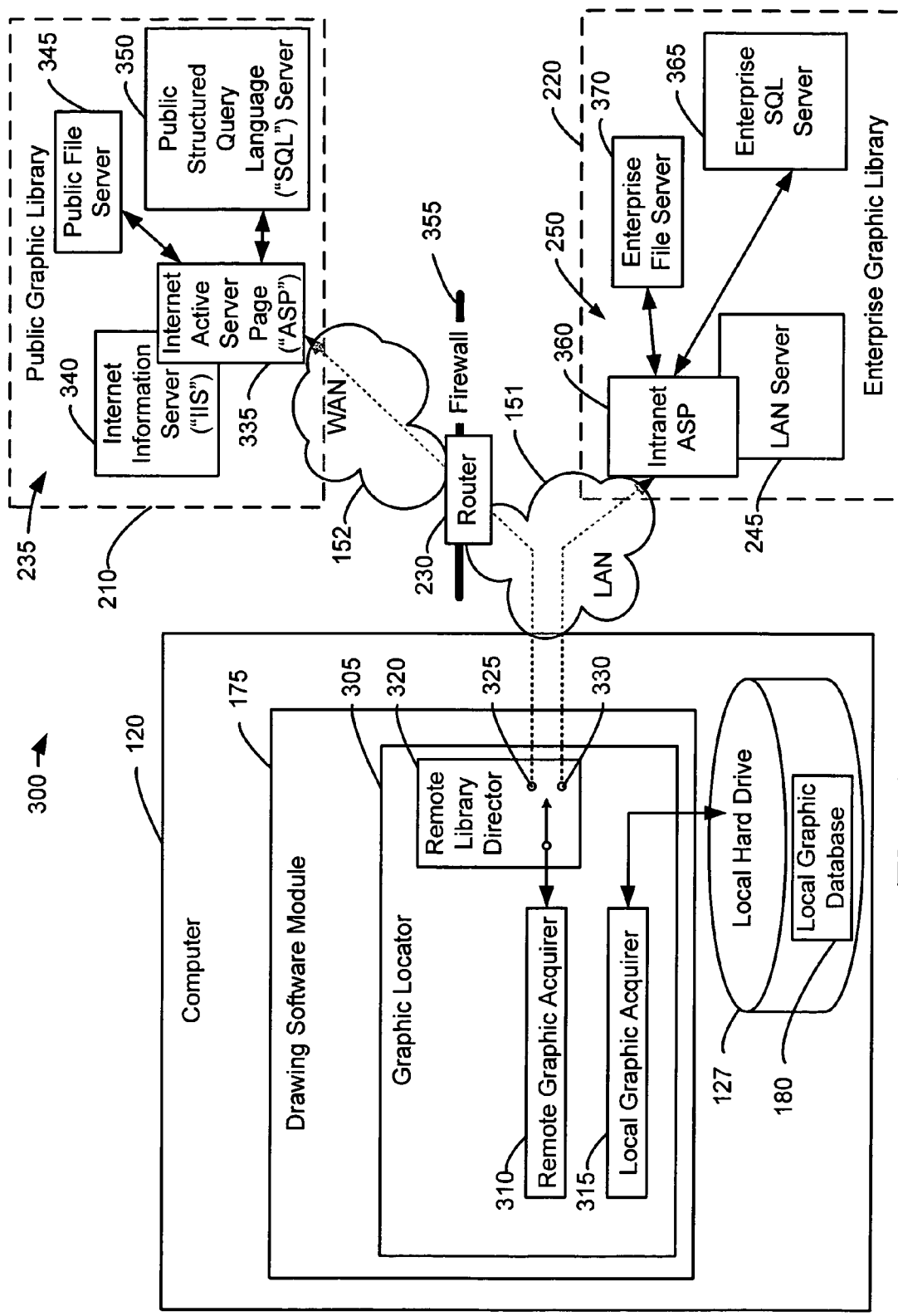
FIG. 3 illustrates a drawing software module with a remote library director that directs communication to either a public graphic library or an enterprise graphic library according to an exemplary embodiment of the present invention.

Turning now to FIG. 3, this figure illustrates a drawing software module 175 installed on a computer 120 with a remote library director 320 that directs communication to either the public graphic library 210 or the enterprise graphic library 220 according to an exemplary embodiment of the present invention. A director is an element that specifies a communication destination. Configuring the remote library director 320 to communicate over the WAN 152 with the public graphic library 210 sets up the drawing software module 175 and the computer 120 on which it resides to operate in a WAN-connected enterprise 205. On the other hand, configuring the remote library director 320 to communicate with the enterprise graphic library 220 on a LAN 151 inside a firewall 355 sets up the drawing software module 175 and computer 120 for a WAN-disconnected enterprise 215.

In one embodiment of the present invention, the remote library director 320 directs communication to both the enterprise graphic library 220 and the public graphic library 210 so that a user in a WAN-connected enterprise 205 that maintains an enterprise graphic library 220 gains access to multiple remote libraries 210, 220. With this capability, a user can search the enterprise graphic library 220 for graphics that are proprietary or otherwise specific to the WAN-connected enterprise 205 and search the public graphic library 210 for content that is public or otherwise nonexclusive to the WAN-connected enterprise 205. That is, a single search can locate graphics in a public graphic database 235, an enterprise graphic database 250, and a local graphic database 180 and return results from all three databases 235, 250, 180. Also, a user can specify one of these databases 235, 250, 180 as a search destination.

The drawing software module 175 is a software program through which a user creates drawings or other documents with graphic content, for example by inserting any of the exemplary graphics described herein onto a drawing page. In one exemplary embodiment of the present invention, the drawing software module 175 is a software program that helps users create business or technical diagrams.

According to one exemplary embodiment of the present invention, the drawing software module 175 is based on the drawing software product sold by Microsoft Corporation of Redmond, Wash. under the registered trademark VISIO. In one exemplary embodiment of the present invention, the drawing software module 175 illustrated in FIG. 3 is an adaptation of the VISIO 2003 program. As supplied, the VISIO 2003 program communicates with a public graphic library 210 maintained by Microsoft Corporation that provides users of the VISIO 2003 program with remote access to graphics from a public graphic database 235 over the Internet 152. A fixed address that the VISIO 2003 program writes into the registry, which is a database used by the computer's operating system 122 to store configuration information, points to the location of this remote library site 235. Overriding this fixed address in the VISIO 2003 program by setting a registry key to a new address causes the VISIO 2003 program to attempt to establish communication with a remote graphic library 220 at the new address. The remote library director 320, which is not a component of the Visio 2003 program, provides this overwriting function. That is, overlaying the remote library director 320 on the VISIO 2003 program provides an exemplary software module 175 according to an embodiment of the present invention. In this configuration, the remote library director 320 directs the VISIO 2003 program to communicate with an enterprise graphic library 220 on a LAN 151 of a WAN-disconnected enterprise 215 by overwriting the address of the public graphic library 210 maintained by Microsoft Corporation with the LAN address of the enterprise graphic library 220.

The remote library director 320 can be a macro, script, batch file, standalone program, manual operation, physical component, or integral software component associated with the drawing software module 175. In one exemplary embodiment of the present invention, the remote library director 320 is a software configuration that is set prior to loading the drawing software module 175 on a computer 120. In another exemplary embodiment of the present invention, a user interface (not shown) accompanies the remote library director 320 so that a user can define the location of a specific remote graphic library or select one graphic library from a list of choices. As an alternative to writing the communication direction into a registry or other database associated with the computer's operating system, the present invention supports using a variety of elements for directing communication. For example, configuration files or internal storage coupled to a user interface can store communication addresses and other information associated with directing communication to a specific destination.

The remote library director 320 is a component of the drawing software module's graphic locator 305. The graphic locator 305 receives user requests for graphics, coordinates acquisition of requested graphics, and transfers acquired graphics to software components (not shown) in the drawing software module 175 that store and display acquired graphics. The graphic locator 305 includes two software modules, a local graphic acquirer 315 and a remote graphic acquirer 310, that it engages for these tasks. The local graphic acquirer 315 finds and acquires graphics stored locally in a local graphic database 180 on the hard drive 127 of the computer 120. This local graphic database 180 stores a set of basic graphics and frequently-used graphics, such as graphics downloaded one or more times from a remote graphic library 210, 220. The remote graphic acquirer 310 finds and acquires graphics from either the public graphic library 210 or the enterprise graphic library 220 according to the configuration of the remote library director 320.

Configuring the remote library director 320 to communicate with the public graphic library 210 sets up the drawing software module 175 for a WAN-connected enterprise 205. In this state 325, graphic requests from the remote graphic acquirer 310 propagate across the LAN 151 of the WAN-connected enterprise 205 to the router 230, which typically serves as a demarcation point between the LAN 151 and the WAN 152. The remote graphic acquirer generates these requests as extensible markup language ("XML") documents. The router 230 sends these XML documents through the firewall 355, which prevents unauthorized access onto LAN 151, and onto the WAN 152 towards the public graphic library 210. An ASP 335 associated with an Internet information server ("IIS") 340 at the public graphic library 210 receives these XML documents and responds accordingly. The ASP 335 can be a dynamically created Web page with an ASP extension that utilizes ActiveX scripting.

The ASP 335 is also linked to a public file server 345 and a public structured query language ("SQL") server 350 at the public graphic library 210. That is, the public graphic base 235 is distributed between the IIS 340, the public file server 345, and the public SQL server 350. The public file server 345 contains graphic files, while the SQL server 350 contains metadata associated with each graphic. The SQL server 350 is a database management system ("DBMS") that responds to queries formatted in SQL language from the ASP 335.

When the ASP 335 receives an inquiry for graphic metadata from the remote graphic acquirer 310 in the format of an XML document, it queries the SQL server 350. When the SQL server 350 supplies the requested metadata, the ASP 335 relays it back to the remote graphic acquirer 310. When the ASP 335 receives an inquiry for a full graphic file from the remote graphic acquirer 310, it acquires that graphic file from the public file server 345 and sends it to the remote graphic acquirer 310.

In one embodiment of the present invention, a single server contains the IIS 340, the public file server 345, and the SQL server 350. That is, the IIS server 340, the public file server 345, and the SQL server 350 can be either virtual servers in a single enclosure or separate servers located in separate enclosures. Furthermore, the public file server 345 and the public SQL server 350 can be virtual servers within the IIS 340.

For each illustrated component 335, 340, 345, 350 and function in the public graphic library 210, the enterprise graphic library 220 includes a corresponding component 360, 245, 370, 365, and function. The parallelism between these two remote libraries 210, 220 enables the remote graphic acquirer 310 to interact with the enterprise graphic library 220 as if it were the public graphic library 210. In other words, the communication destination, whether it is the public graphic library 210 or the enterprise graphic library 220, is essentially transparent to the remote graphic acquirer 310 in one exemplary embodiment of the present invention.

When the remote library director 320 is configured to the enterprise graphic library state 330, the remote graphic acquirer's XML documents arrive at the intranet ASP 360 on the LAN 151 within the firewall 355 rather than the Internet ASP 335 on the WAN 152. The intranet ASP 360 queries the enterprise SQL server 365 for metadata or the enterprise file server 370 for full graphic files according to the content of the XML document. The intranet ASP 360 returns such information that it acquires from the enterprise SQL server 365 and the enterprise file server 370 to the location on the LAN 151 of the computer 120 that originated the graphic request. This computer 120 is within the LAN-disconnected enterprise 215 (shown in FIG. 2).

The enterprise file server 370 and the enterprise SQL server 365 are typically virtual servers within a LAN server 245 associated with the intranet ASP 360. However, these three servers 245, 370, 365 can be distinct, interconnected hardware devices that are components of the enterprise graphic database 250.

Those skilled in the art appreciate that the communications, database management schemes, and programming languages described herein are exemplary and can practice the present invention using assorted database configurations, communication protocols and programming languages known in the art based on the description. For example, the public SQL server 350 and the private SQL server 365 can be servers that provide the functions described herein based on a programming language other than structured query language. And, communication between the remote graphic acquirer 310 and the Internet active server page 335 or the intranet active server page 360 can occur with various communication formats and languages other than the transmission of XML documents.

Those skilled in the art appreciate that using an ASP to access to a graphic database is exemplary and that the present invention supports a range of options for this function. The present invention can include web scripting modules such as hypertext preprocessor ("PHP"), practical extraction and report language ("Perl"), Java server page ("JSP"), or other alternatives known in the art. Furthermore, a range of web servers that are known to those skilled in the art can provide similar function to the exemplary IIS web server 340 discussed herein.

Figure 4C:
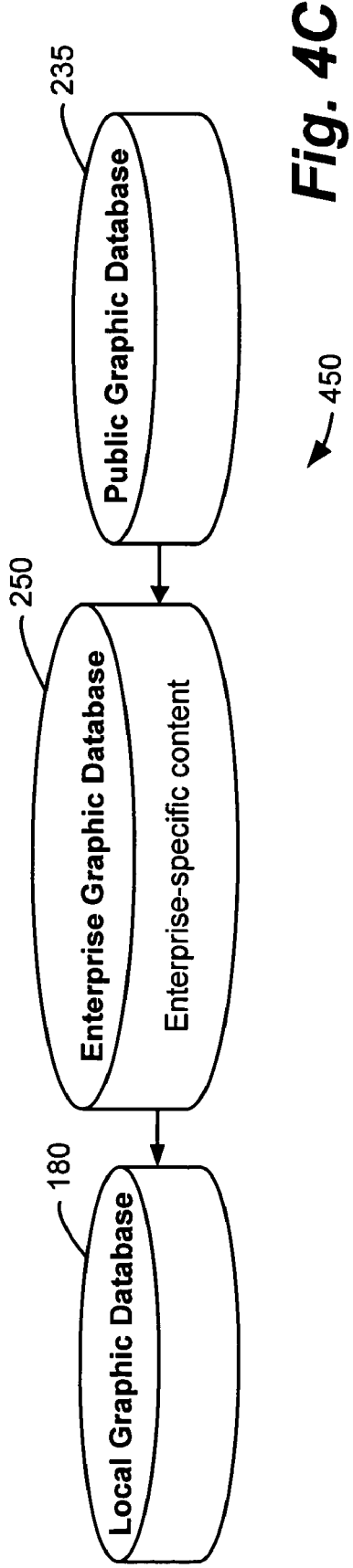

Turning now to FIGS. 4A, 4B, and 4C, these figures illustrate the content of local, enterprise, and public databases 180, 250, 235 according to three exemplary embodiments of the present invention.

FIG. 4A illustrates a public graphic database 235, which is coupled to the WAN 152, containing periodically appended or otherwise updated content. Upon such revision, the administrator of this remote database 235 provides a copy to the administrator of the enterprise graphic database 250, such as the IT department of a WAN-disconnected enterprise 215. The public graphic database administrator can send the enterprise IT department either a full database backup or the public content revisions occurring since its last transmission of content. The IT department updates the enterprise graphic database 250 to synchronize its content changes with those of the public graphic database 235. That is, the content of the enterprise graphic database 250 is a duplicate of public graphic library's content. In this configuration 400, a user in a WAN-disconnected enterprise 215 accesses the same graphic content from the enterprise graphic database 250 that a user in a WAN-connected enterprise 205 accesses from the public graphic database 235. The local graphic database 180, which is maintained locally on the user's hard drive 127, contains frequently used graphics including a standard graphic set and downloaded graphics.

FIG. 4B illustrates an exemplary embodiment of the present invention wherein the enterprise graphic database 250 includes content from the public graphic database 235 in addition to content generated by the WAN-disconnected enterprise 215 and/or third-party graphic sources. A WAN-disconnected enterprise 215 implements this database configuration 425 to provide its employees with a large selection of graphics, for example. When an employee generates a new graphic, the user may elect to upload it onto the enterprise graphic database 250 so other employees can access it.

FIG. 4C illustrates another exemplary embodiment of the present invention wherein the WAN-disconnected enterprise 215 controls the enterprise graphic database 250 so that its content is specific to that enterprise 215. With this control, the users on the LAN 151 of the WAN-disconnected enterprise 215 access consistent graphic content and generate drawings and other documents that exhibit a uniform appearance. The WAN-disconnected enterprise 215 can adopt a standard set of graphics so that each user on the LAN 151 uses the same architectural symbols or other symbols that are important to the enterprise's operations, for example. For example, the enterprise graphic database 250 can hold content that is not available on the public graphic database 235 such as internally produced graphics, logos, custom icons, or shapes that are unique to a company or organization. In one embodiment of the present invention, the enterprise graphic database 250 and the public graphic database 235 do not contain overlapping content.

In this database configuration 450, the management of the WAN-disconnected enterprise 215 screens the content updates that it receives from the public graphic library 210 and determines the content that is acceptable for inclusion its enterprise graphic database 250. Management adopts new content that will enhance the documents generated by the enterprise 215 without compromising its document standards and rejects unacceptable content. This enterprise graphic database 250 can be a private graphic database.

Figure 5:
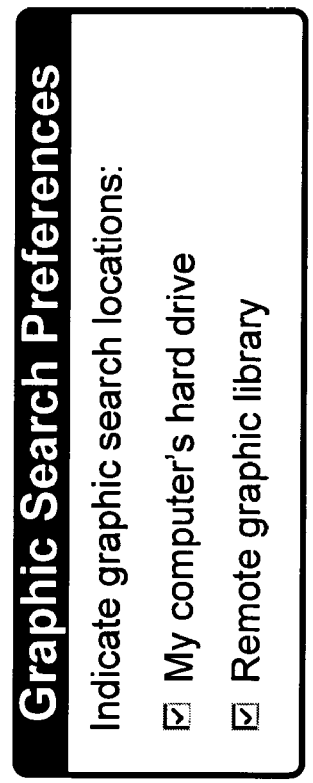
FIG. 5 illustrates a user interface for setting graphic search preferences according to an exemplary embodiment of the present invention.

FIG. 5 illustrates a user interface 500 for entering graphic search preferences according to an exemplary embodiment of the present invention. The drawing software module 175 displays this user interface window 500 when a user engages a pull down menu or provides another prompt. A user may elect to seek graphics from the local graphic database 180, a remote graphic database 235, 250, or both. When a user is isolated from both the WAN 152 and the LAN 151 and can access neither the public graphic library 210 nor the enterprise graphic library 220, the user can elect to access graphics exclusively from the local graphic database 180, for example.

When the user elects to seek graphics remotely, the state 325, 330 of the remote library director 320 defines the remote source as either the public graphic database 235 or the enterprise graphic database 250. In one exemplary embodiment of the present invention, the graphic locator 305 searches for graphics from a remote graphic library 210, 220 only if the user opts for a remote search. And, if a user opts for a remote search the remote library director 320 defines destination of that search.

Figure 6A:
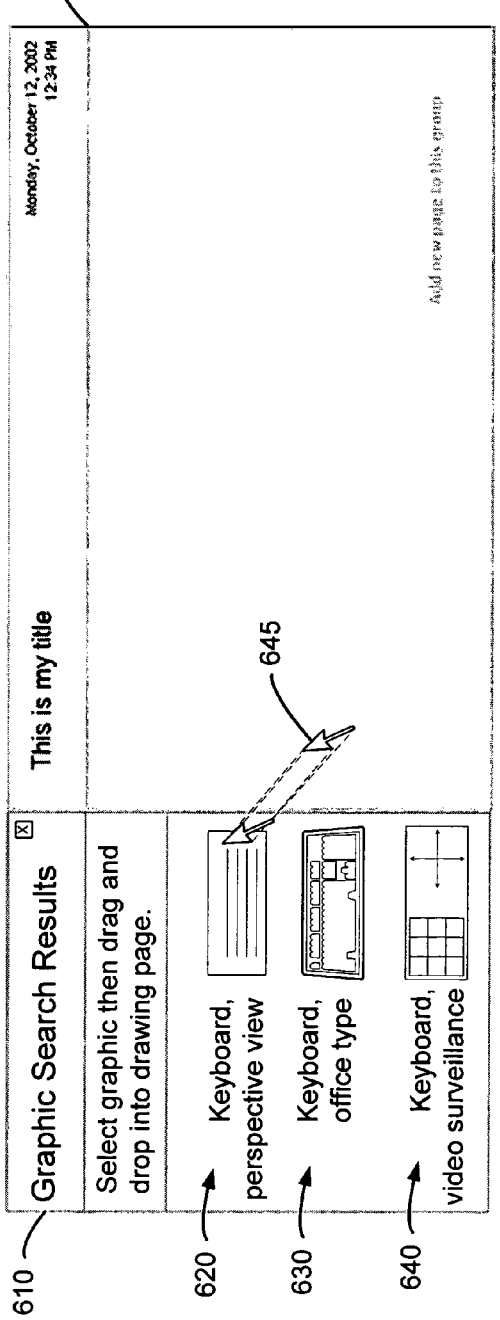
FIGS. 6A and 6B illustrate selecting a graphic from a search window and inserting the selected graphic on a drawing page according to an exemplary embodiment of the present invention.
Figure 6B:
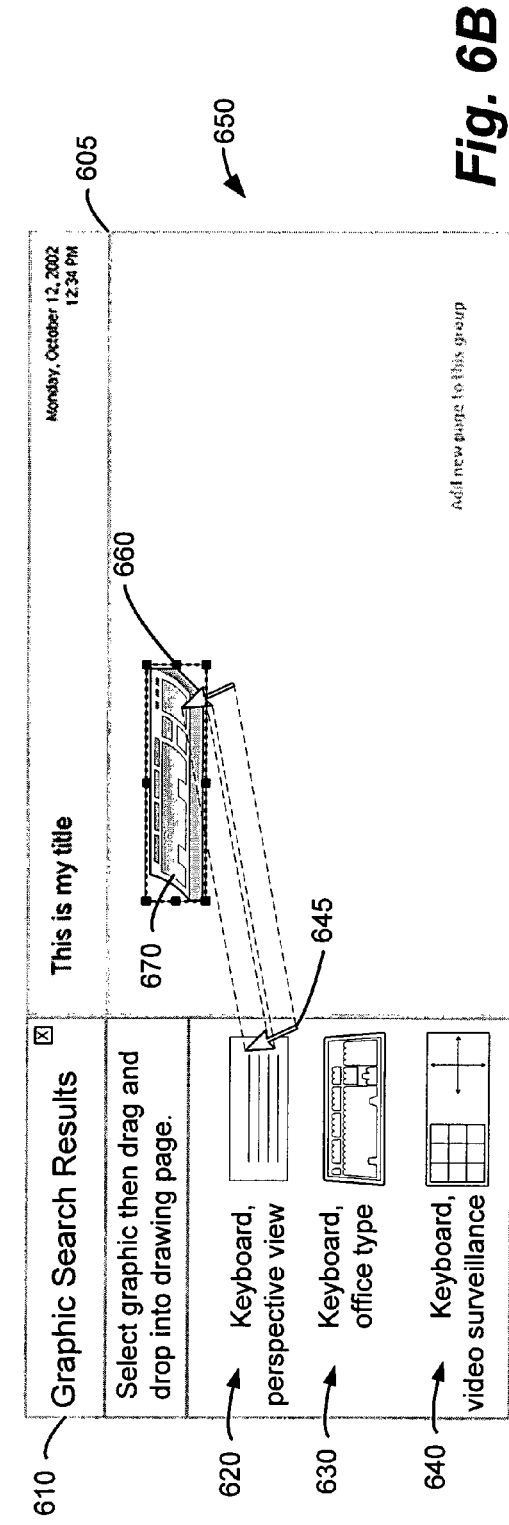

FIGS. 6A and 6B illustrate selecting a graphic from a search window 610 and inserting the selected graphic on a drawing page 605 according to an exemplary embodiment of the present invention. When a user desires to insert a graphic onto a drawing page 605, the user can enter a search term such as "computer keyboard" or other descriptor that describes the desired graphic. The graphic locator 305 responds to this entry and engages the remote graphic acquirer 310 and the local graphic acquirer 315 to find graphics that match the description.

The local graphic acquirer 315 searches the local graphic database 180, while the remote graphic acquirer searches one of the remote graphic databases 235, 250. A search window 610 in the user interface 600 displays a list of identified graphics 620, 630, 640 meeting the search term. The search window 610 displays each listed graphic 620, 630, 640 in metadata form including a representative image and a textual description of the graphic. The representative image can be a bit-mapped image of the graphic, line drawing, a simple icon symbolizing the graphic, or other visualization element.

As illustrated in the exemplary display configuration 600 of FIG. 6A, the user selects an entry 620 from the list of entries 620, 630, 640 in the search window and moves a pointer 645 or cursor over that entry 620. As illustrated in the exemplary display configuration 650 of FIG. 6B, the user depresses a button on a mouse 141 (illustrated in FIG. 1) and drags the entry 620 to a desired location on the drawing page 605. The user drops the graphic 670 at the desired location by releasing the mouse button. To insert the graphic 670 at the desired location rather than merely the metadata 620 associated with the graphic 670, the user's drag-and-drop gesture triggers the graphic locator 305 to load the full graphic file from the appropriate graphic database 180, 250, 235.

If the selected graphic 670 is located in the local graphic database 180, the graphic locator engages the local graphic acquirer 315 to load the graphic 670 from the local hard drive 127. On the other hand, if the selected graphic 670 is located in a remote graphic database 235, 250, the graphic locator 305 enlists the remote graphic acquirer 310 to download the graphic 670 from the remote graphic library 210, 220 that corresponds to the configuration 325, 330 of the remote library director 320.

When loading of the graphic is complete, the drawing software module 175 displays the graphic 670 at the intended location of the drawing page 605 in a selection box 660. The selection box 660 indicates that the graphic 670 remains active and enables the user to resize, reshape, or otherwise customize the graphic 670.

Figure 7:
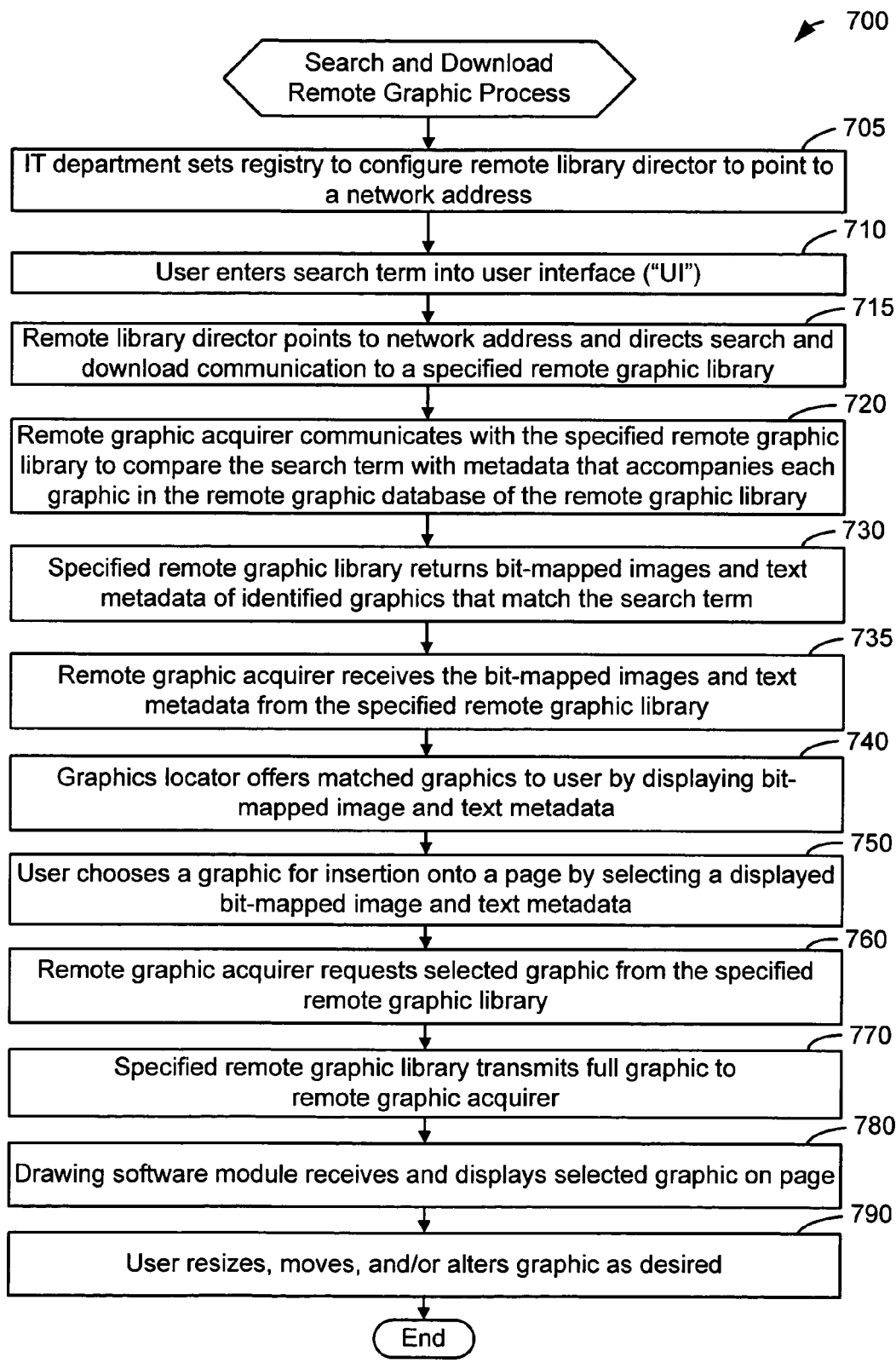
FIG. 7 illustrates a process for searching a remote graphic library and downloading graphics according to an exemplary embodiment of the present invention.

Turning now to FIG. 7, this figure illustrates a process 700 entitled "Search and Download Remote Graphic" for searching a remote graphic library 210, 220 and downloading graphics according to an exemplary embodiment of the present invention.

At Step 705, the IT department or other party providing a software administrative function configures the drawing software module 175 so that the remote library director 320 points to a network address of either the public graphic library 210 or the enterprise graphic library 220. The IT department can automatically set a registry key that points to the communication destination, for example. At Step 710, a user of the drawing software module 175 enters a search term into a search window 610 associated with a drawing page 605 of a user interface 600.

At Step 715, the remote library director 320 directs communication between the remote graphic acquirer 310 and a specified remote graphic library 210, 220. The configuration 325, 330 of the remote library director 320 determines whether the remote graphic acquirer 310 communicates with the public graphic library 210 or the private graphic library 220. This communication includes searching for graphics and transferring metadata and full graphic files.

At Step 720, the remote graphic acquirer 310 sends user-entered search terms to the specified graphic library 210, 220 for comparison with the metadata that accompanies each graphic in the remote graphic database 235, 250. A search ensuing from this communication may turn up one or more candidate graphics with metadata matching the search parameters.

At Step 730, the specified graphic library 210, 220 returns bit-mapped images and text metadata of each of these candidate graphics. At Step 735, the remote graphic acquirer 310 receives the bit-mapped images and text metadata from the remote graphic library 210, 220 specified by the state 325, 330 of the remote library director 320.

At Step 740, the graphic locator 305 under the direction of the drawing software module 175 offers the user a list of the matched graphics in a metadata format as candidate graphics for insertion into the user's drawing page 605 as illustrated in FIG. 6A and described above. At Step 750, the user chooses one of the candidate graphics by selecting a displayed bit-mapped image 620 and text metadata as illustrated in FIG. 6B and described above.

At Step 760, the remote graphic acquirer 310 responds to the user's selection of a graphic and requests the full graphic from the remote graphic library 210, 220. At Step 770, either the public graphic library 210 or the enterprise graphic library 220 responds to the request and transmits the full graphic file to the remote graphic acquirer 310.

At Step 780, the drawing software module 175 receives the full graphic file and displays the graphic 670 on the drawing page 605. At Step 790, the user modifies the graphic 670 so that it is suited to its specific role on the drawing page 605. Modification options include resizing, moving, altering, re-coloring, reshaping, and other operations.

Figure 8A:
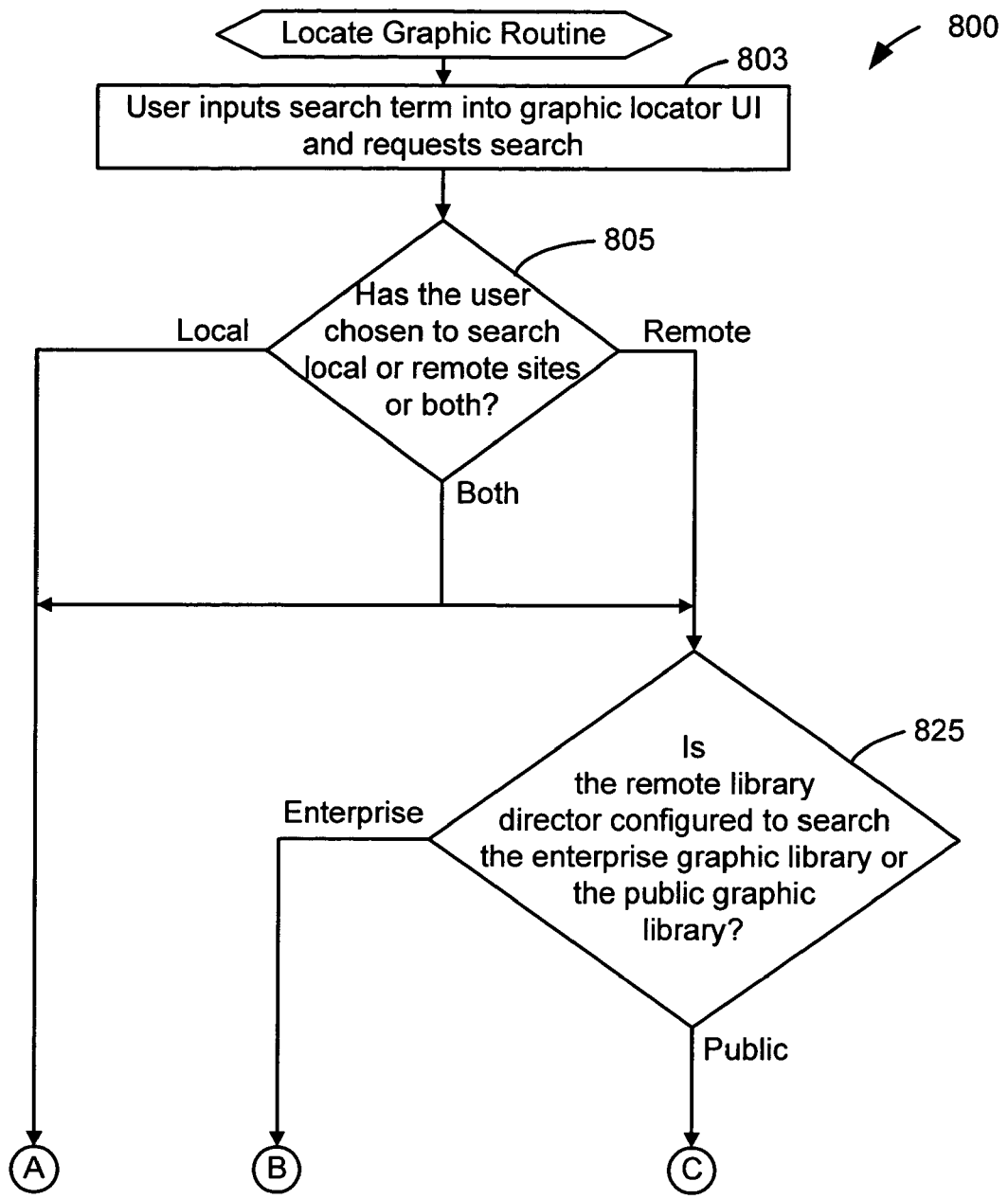
FIGS. 8A and 8B illustrate a routine for locating graphics according to an exemplary embodiment of the present invention.
Figure 8B:
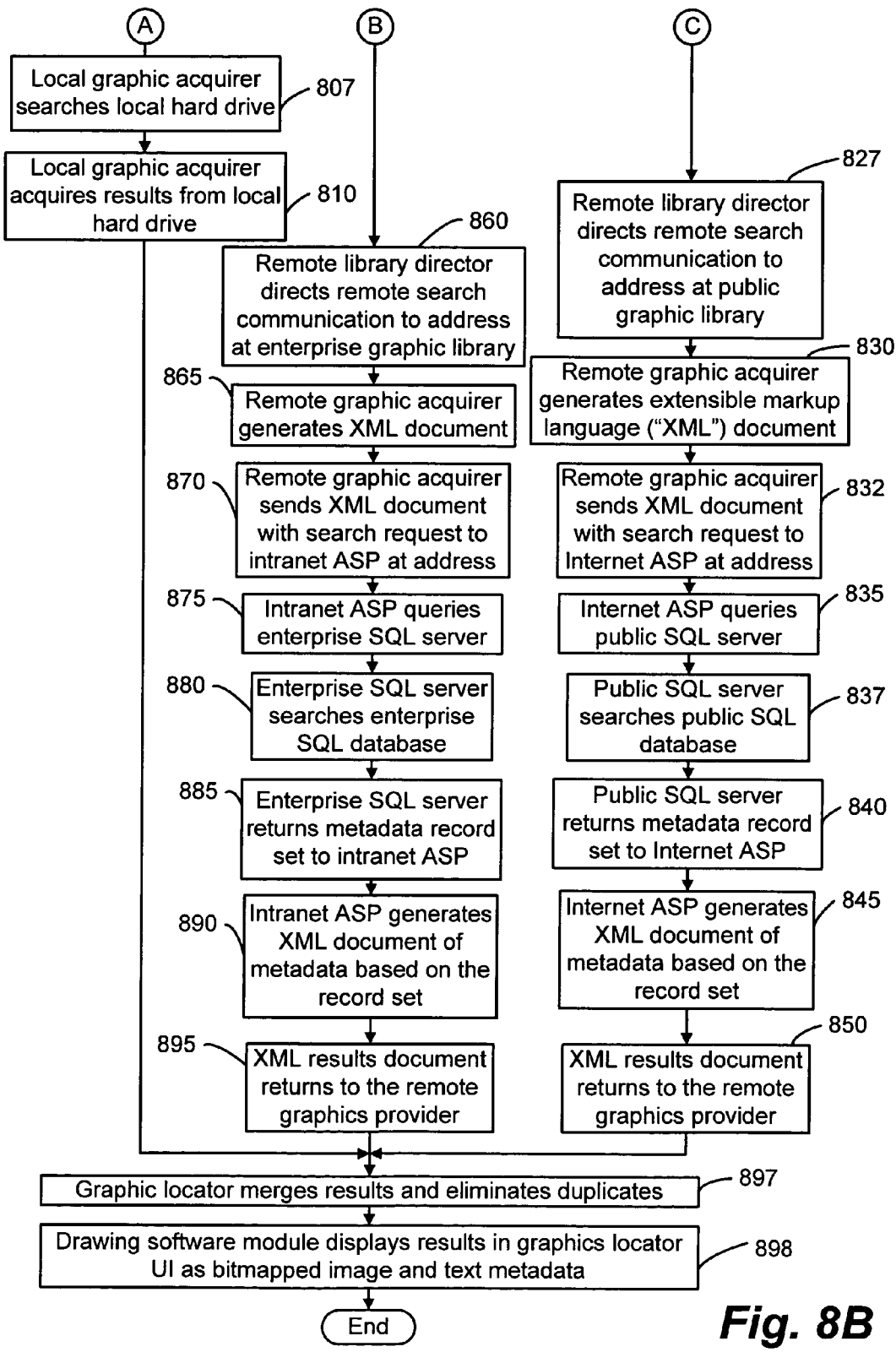

Turning now to FIGS. 8A and 8B, these figures illustrate a routine 800 entitled "Locate Graphic" for locating graphics according to an exemplary embodiment of the present invention.

At Step 803, a user enters a search term such as "keyboard" into the user interface of the graphics locator 305 and requests a search. For example, the user can initiate a search for graphics through the search window 610 illustrated in FIG. 6A.

Inquiry Step 805 determines if the user has chosen to search the local graphic database 180 on the hard drive 127 of the user's computer 120, a remote graphic library 220, 210, or both the local database 180 and a remote library 220, 210. The user has the option to enter such search preferences through a search window 500 as illustrated in FIG. 5.

If the user has selected to search locally or both locally and remotely, Routine 800 executes Step 807 wherein the local graphic acquirer 315 searches the local hard drive 127 for graphics that match the search term. At Step 810, the local graphic acquirer 315 acquires the results from the local graphic database 180 in metadata format.

If inquiry step 805 determines that the user has chosen to search for graphics at a remote library 210, 220 either in conjunction with searching the local graphic database 180 or instead of the local graphic database 180, Routine 800 executes inquiry Step 825. Inquiry Step 825 determines if the remote library director 320 is configured to direct remote graphic communication, including search inquiries, to a site on the LAN 151 of the enterprise graphic library 220 or a site on the WAN 152 of the public graphic library 210.

If the remote library director 320 is configured to direct communication to the public graphic library 210, Routine 800 executes Step 827 through Step 850. On the other hand, if the remote library director 320 directs search communication to the enterprise graphic library 220, Routine 800 executes Steps 860 through Step 895.

If Step 825 results in Routine 800 directing execution flow through Step 827, then at Step 827 the remote library director 320 directs remote search communication to the public graphic library 210 on the WAN 152. At Step 830, the remote graphic acquirer 310 generates an XML document containing graphic search parameters in accordance with the search terms entered in Step 803.

At Step 832, the remote graphic acquirer 310 sends the XML document to the Internet ASP 335 of the public graphic library 210 that is associated with the IIS 340 of that library 210. The XML document passes onto the LAN 151 and to the router 230 of the WAN-connected enterprise 205. The router 230 transmits the XML document onto the WAN 152 for arrival at the address of the Internet ASP 335.

At Step 835, the Internet ASP 335 receives the XML document from the remote graphic acquirer 310 and, in response, queries the public SQL server 350 to identify metadata that matches the search terms. At Step 837, the public SQL server 350 responses to the query from the Internet ASP 335 and searches the its public SQL database that is on that server 837 and that contains metadata for each graphic in the public graphic library 210.

At Step 840, the public SQL server 350 returns the record set containing the metadata meeting the search criterion to the Internet ASP 335. At Step 845, the Internet ASP 335 generates an XML document based on the record set from the public SQL server 350. That is, the Internet ASP 335 places a list of the graphics that meet the search term along with image and text metadata for each entry in the list into an XML document.

At Step 850, the Internet ASP 335 transmits the XML document back to the remote graphic acquirer 310 that originated the search request. This document and the search results contained therein over the WAN 152 and through the WAN-connected enterprise LAN 151 for receipt by the user computer 120.

If the remote library director 320 is configured to seek graphics from an enterprise graphic library 220 rather than the public graphic library 210, then at inquiry Step 825, as discussed above, Routine 800 executes Step 860. At Step 860, the remote library director 320 directs search communication to the enterprise graphic library 220.

At Step 865, the remote graphic acquirer 310 generates an XML document which can be essentially the same XML document described above in reference to Step 830. That is, in one embodiment of the present invention, Step 865 and Step 830 generate essentially the same XML document containing graphic search parameters including one or more search terms.

At Step 870, the remote graphic acquirer 310 sends the XML document to the intranet ASP 360 of the enterprise graphic library 220. The XML document travels to the address defined by the remote library director 320 which is the LAN address of the enterprise graphic library 220 within the firewall 355 of the WAN-disconnected enterprise 215. The intranet ASP 360 provides similar function to the Internet ASP 335 and accepts and receives information in the same format.

At Step 875, the intranet ASP 360 queries the enterprise SQL server 365 to identify graphics matching the search terms entered in Step 803. At Step 880, the enterprise SQL server 365 responds to the intranet ASP's query and searches its internal enterprise SQL database for matches to the user's search terms. At Step 885, the enterprise SQL server 365 returns the record set of search results and metadata to the intranet ASP 360. At Step 890, the intranet ASP 360 generates an XML document based on the record set. At Step 895, the intranet ASP 360 transmits the XML document containing search results to the remote graphic acquirer 310 at the user's computer 120.

At Step 897, the graphic locator 305 merges search results from each of the graphic databases 180, 235, 250 that were searched and that identified suitable graphics content. The graphic locator 305 also eliminates duplicate results so that each search result is associated with a single graphic database.

At Step 898, the drawing software module 175 displays the search results in metadata form, as a list of bitmapped images and accompanying text descriptors. FIG. 6A illustrates an exemplary user interface 600 following this format.

Figure 9A:
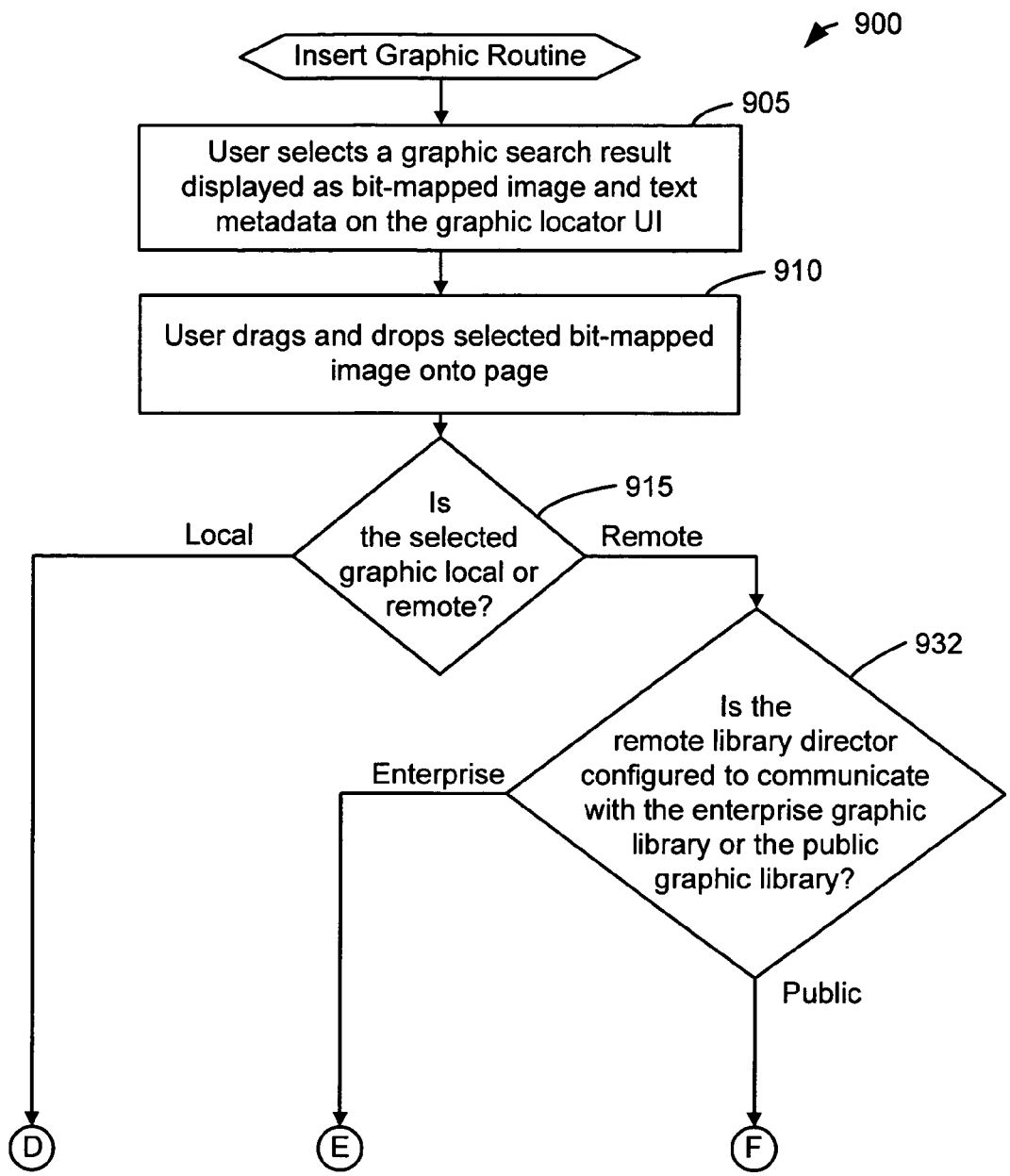
FIGS. 9A and 9B illustrate a routine for downloading a graphic and inserting it into a drawing according to an exemplary embodiment of the present invention.
Figure 9B:
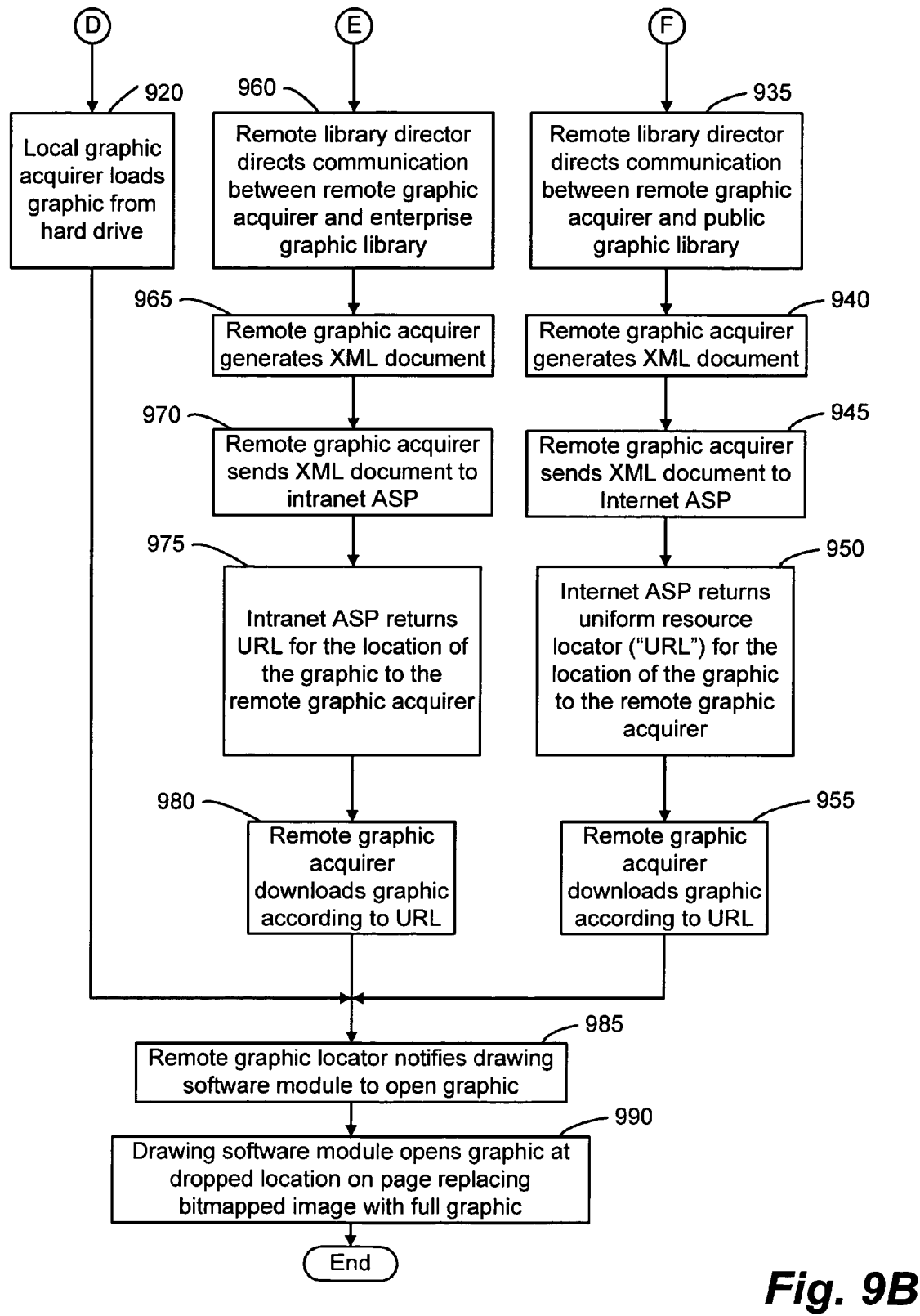

From these search results, a user can select a specific graphic for downloading and insertion onto a document page. FIGS. 9A and 9B illustrate a routine 900 entitled "Insert Graphic" for downloading a graphic and inserting it into a drawing or other document according to an exemplary embodiment of the present invention.

At Step 905 in Routine 900, the user originating the search selects a search result, which as described above is displayed as a bit-mapped image and text metadata on the graphic locator user interface. FIG. 6B illustrates such an exemplary display 600.

At Step 910, the user drags and drops the selected bitmapped image 620 into the drawing page 605. Alternatively, the user can select this image 620 using arrow and function keyboard keys and depress the control key and the enter key in combination to move the image 620 onto the page 605. Subsequent flow of Routine 900 proceeds according to the location of the selected graphic as determined in inquiry Step 915 and inquiry Step 932. If the selected graphic is local, Routine 900 executes Step 920 and engages the local graphic acquirer 315 to load the selected graphic from the local graphic database 180 on the hard drive 127 of the user's computer 120. If the selected graphic is remote, then Routine 900 executes inquiry Step 932.

If the inquiry of Step 932 determines that the remote library director 320 is configured to the public graphic library state 325, Routine 900 proceeds to Step 935 and the remote library director 320 directs communication between the remote graphic acquirer 310 and the public graphic library 210.

At Step 940, the remote graphic acquirer 310 generates an XML document containing a request to download the specific graphic that the user selected. At Step 945, the remote graphic acquirer 310 sends this XML document to the Internet ASP 335 via the WAN 152. That is, the request for a specific graphic transmits across the WAN-connected enterprise's firewall 355 to the address on the WAN 152 of the public graphic library 210. This address complies with the state 325 of the remote library director 320.

At Step 950, the Internet ASP 335 returns the uniform resource locator ("URL") for the location of the selected graphic to the remote graphic acquirer 310. A URL specifies an address of documents and other resources on a web such as the World Wide Web and typically defines a protocol and an Internet Protocol ("IP") or domain name where the resource is located. At Step 955, the remote graphic acquirer 310 uses this URL to download the selected graphic.

If the remote library director 320 is configured to the enterprise state 330 rather than the public library state 325, then following Step 932, Routine 900 executes Step 960 and the remote library director 320 directs communication between the remote graphic acquirer 310 and the enterprise graphic library 220.

At Step 965, the remote graphic acquirer 310 generates an XML document that specifies the requested graphic. Since the destination of the XML document is not required to be included in the document itself, this XML document can be essentially the same XML document generated by Step 940, which is described above.

At Step 970, the remote graphic acquirer 310 transmits the XML document to the intranet ASP 360 under the direction of the remote library director 320. The remote graphic acquirer 310 initiates the transmission and the remote library director 320 specifies the destination, which is the enterprise graphic library 220 on the LAN 151.

At Step 975, the intranet ASP 360 returns the URL for the location of the graphic to the remote graphic acquirer 310. That is, the intranet ASP 360 replies to the remote graphic acquirer's request and provides the location of the specific graphic that the use wants to place in the active drawing document.

At Step 980, the remote graphic acquirer 310 receives the URL from the intranet ASP 360 and downloads the graphic from the enterprise graphic library 220 based on the URL.

At Step 985, the routine flow converges and Routine 900 executes Step 985 whether the graphic is local or remote and whether the remote library director is configured to the enterprise state 330 or the public library state 325. At Step 985, the remote graphic locator 305 receives the requested graphic and notifies the drawing software module 120 that the graphic is ready to be opened and placed into the user's document.

At Step 990, the drawing software module 175 removes the bitmapped image displayed as metadata and replaces it with the full graphic by opening the full graphic and inserting it at the location indicated by the user's drag-and-drop gesture.

The user can customize the graphic, for example skewing, re-coloring, or resizing it. If the user requests additional searches and inputs more graphics, the graphic locator 305 repeats Routine 800 and Routine 900 to accommodate the request.

In summary, the present invention provides an enterprise that is isolated from a public database of graphics with a graphic database that serves the needs of the enterprise and that can comprise graphic content drawn from the public database. The present invention supports a drawing software program that conducts searches for graphics from a remote graphic database in an environment of multiple remote graphic databases. The configuration of the software program can direct search communication to a select graphic database.

From the foregoing, it will be appreciated that the present invention overcomes the limitations of the prior art. From the description of the embodiments, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A method performed by a computer system having a processor and memory of inserting a graphic onto a drawing page of a drawing software module installed on the computer system, wherein the drawing software module is configured to access by default a local graphic library that is installed on the computer system, the method comprising:

providing access to an enterprise graphic library maintained on a local area network, wherein the enterprise graphic library includes content transferred from a public graphic library accessible via a wide-area network to the enterprise graphic library, wherein the enterprise graphic library and the public graphic library are both remote from the computer system, and wherein the enterprise graphic library and the public graphic library are both separate from the local graphic library the drawing software module is configured to access by default;

maintaining in the memory of the computer system the local graphic library;

receiving from a user configuration information, wherein the configuration information indicates that the enterprise graphic library and the public graphic library are accessible to the drawing software module in addition to the local graphic library the drawing software module is configured to access by default;

configuring the drawing software module to access the enterprise graphic library and the public graphic library based on the received configuration information;

receiving from the user a search term that describes a desired graphic and a selection of whether to search the local graphic library, the remote graphic libraries, or both;

when the user selects to search the remote graphic libraries, directing the computer system to communicate with the enterprise graphic library and the public graphic library based on the configuration of the drawing software module, wherein the directing comprises:

identifying by the computer system one or more graphics in the enterprise graphic library that match the received search term, and identifying by the computer system one or more graphics in the public graphic library that match the received search term;

when the user selects to search the local graphic library, identifying by the computer system one or more graphics in the local graphic library that match the received search term;

retrieving from the graphic libraries in which the graphics were identified metadata associated with each of the identified graphics;

displaying to the user the retrieved metadata;

receiving from the user a selection of one of the identified graphics based on the displayed metadata;

retrieving the selected graphic from the graphic library in which the graphic was identified; and inserting the selected graphic onto the drawing page of the drawing software module.

2. The method of claim 1 wherein the enterprise graphic library is a private graphic library accessible only to a defined set of users and others with authorization.

3. The method of claim 1 wherein an address for each of the graphic libraries is written into a configuration database associated with an operating system of the computer.

4. The method of claim 1 wherein the metadata comprises a representative, abridged image of the graphic.

5. The method of claim 1 wherein at least one of the selected graphic libraries is located inside a firewall of an enterprise.

6. The method of claim 1 wherein at least one of the selected graphic libraries is located at an intranet site, and wherein the identifying one or more graphics comprises generating a document associated with the identified graphics and transmitting the document to an active server page of an intranet site.

7. The method of claim 1 wherein the configuring includes storing an address of each graphic library.

8. The method of claim 7, further comprising changing a stored address to point to a different graphic library.

9. A computer-readable storage medium having computer-executable instructions for implementing a method of inserting a graphic onto a drawing page of a drawing software program installed on a computer, wherein the drawing software program is configured to access by default a local graphic database that is installed on the computer, the method comprising:

providing access to an enterprise graphic database maintained on a local area network, wherein the enterprise graphic database includes content transferred from a public graphic database accessible via a wide-area network to the enterprise graphic database, wherein the enterprise graphic database and the public graphic database are both remote from the computer, and wherein the enterprise graphic database and the public graphic database are both separate from the local graphic database the drawing software program is configured to access by default;

receiving from a user configuration information, wherein the configuration information indicates that the enterprise graphic database and the public graphic database are accessible to the drawing software program in addition to the local graphic database the drawing software program is configured to access by default;

configuring the drawing software program to access the enterprise graphic database and the public graphic database based on the received configuration information;

receiving from the user a search term that describes a desired graphic and a selection of whether to search the local graphic database, the remote graphic databases, or both;

when the user selects to search the remote graphic databases, directing the computer to communicate with the enterprise graphic database and the public graphic database based on the configuration of the drawing software program, wherein the directing comprises:

identifying by the computer one or more graphics in the enterprise graphic database that match the received search term, and identifying by the computer one or more graphics in the public graphic database that match the received search term;

when the user selects to search the local graphic database, identifying one or more graphics in the local graphic database that match the received search term;

displaying to the user information associated with each of the identified graphics;

receiving from the user a selection of one of the identified graphics based on the displayed information; and inserting the selected graphic onto the drawing page of the drawing software program from the graphic database in which the graphic was identified.

10. The computer-readable storage medium of claim 9 wherein the configuring includes setting a registry key for each of the graphic databases.

11. The computer-readable storage medium of claim 10, further comprising changing a registry key to point to a different graphic database.

12. The computer-readable storage medium of claim 9 wherein one of the selected graphic databases is an active server page, and wherein the receiving from the user the search term comprises receiving an extensible markup language document that is sent to the active server page.

13. The computer-readable storage medium of claim 9 wherein the method further comprises receiving a uniform resource locator of the desired graphic, and wherein the inserting comprises downloading the desired graphic according to the uniform resource locator.

14. The computer-readable storage medium of claim 13 wherein at least one of the graphic databases is located on a private network, and wherein the uniform resource locator locates the desired graphic on a server in the private network.

15. The computer-readable storage medium of claim 9 wherein the information comprises metadata.

16. The computer-readable storage medium of claim 15 wherein the metadata includes an abridged image of the graphic.

17. The computer-readable storage medium of claim 15 wherein the metadata includes a textual description of the graphic.

* * * * *